United States Patent
Raheja et al.

(10) Patent No.: US 12,061,510 B2
(45) Date of Patent: Aug. 13, 2024

(54) TRANSITION INTO AND OUT OF A PARTIALLY-OFF POWER STATE

(71) Applicant: Advanced Micro Devices, Inc., Santa Clara, CA (US)

(72) Inventors: Jyoti Raheja, Arlington, MA (US); Alexander J. Branover, Chestnut Hill, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/193,222

(22) Filed: Mar. 5, 2021

(65) Prior Publication Data

US 2021/0191493 A1     Jun. 24, 2021

Related U.S. Application Data

(63) Continuation of application No. 16/133,390, filed on Sep. 17, 2018, now Pat. No. 10,955,892.

(51) Int. Cl.
*G06F 1/3206*     (2019.01)
*G06F 1/3234*     (2019.01)
(Continued)

(52) U.S. Cl.
CPC .......... *G06F 1/3206* (2013.01); *G06F 1/3234* (2013.01); *G06F 9/4401* (2013.01); *G06F 9/542* (2013.01)

(58) Field of Classification Search
CPC .... G06F 3/1221; G06F 3/1229; G06F 1/3203; G06F 1/3284; G06F 1/266; G06F 1/3234;
(Continued)

(56) References Cited

U.S. PATENT DOCUMENTS 7,315,955 B2 *   1/2008   Yamazaki ................. G06F 1/26
                                                                               320/155
9,383,801 B2      7/2016   Branover et al.
(Continued)

OTHER PUBLICATIONS

Microsoft, "System Power States," Retrieved from https://docs.microsoft.com/en-us/windows/desktop/power/system-power-states, Aug. 6, 2018, 9 pages.

(Continued)

*Primary Examiner* — Faisal M Zaman
(74) *Attorney, Agent, or Firm* — Zagorin Cave LLP (57) ABSTRACT

The computer system responds to a first trigger event to enter a partial off state in which a boot cycle is required to return to a working state. A device plugged into a serial bus port can be charged in the partial off state. A configuration register or runtime environment controls whether the computer system enters the partial off state in response to a trigger event. The computer system stays in the partial off state until another trigger event returns the computer system to the working state. In some implementations, the computer system leaves the partial off state and enters the shutdown state after an unplug event, a predetermined amount of time after an unplug event, a predetermined amount of time after entering the partial off state, a predetermined amount of time after charging of a device is complete, or any combination of such events.

19 Claims, 4 Drawing Sheets

(51) Int. Cl.
*G06F 9/4401* (2018.01)
*G06F 9/54* (2006.01)

(58) Field of Classification Search
CPC .... G06F 1/3287; G06F 9/4418; G06F 1/3206; G06F 11/3062; G06F 1/3265; G06F 1/3278; G06F 2213/0042; G06F 11/1441; G06F 9/4401; G06F 9/542; G06F 9/442; G06F 9/5094; H04L 12/10; Y02D 10/00
USPC .......................... 713/300, 320–324, 340, 100
See application file for complete search history.

(56) References Cited

U.S. PATENT DOCUMENTS

| | | | |
|---|---|---|---|
| 9,785,218 B2 | 10/2017 | Branover et al. | |
| 9,929,576 B2* | 3/2018 | Lee | H02J 7/007192 |
| 10,955,892 B2* | 3/2021 | Raheja | G06F 9/542 |
| 11,368,321 B2* | 6/2022 | Chen | G06F 1/3209 |
| 11,587,149 B2* | 2/2023 | Zucker | G06V 20/10 |
| 2003/0054703 A1 | 3/2003 | Fischer | |
| 2004/0003296 A1 | 1/2004 | Robert | |
| 2005/0094786 A1* | 5/2005 | Ossa | H04M 15/88 379/111 |
| 2006/0035527 A1 | 2/2006 | Numano | |
| 2006/0294403 A1* | 12/2006 | Bennett | G06F 1/3203 713/300 |
| 2007/0293953 A1* | 12/2007 | Hoshi | H04B 3/54 700/12 |
| 2008/0276302 A1* | 11/2008 | Touboul | G06F 21/85 726/3 |
| 2009/0089481 A1* | 4/2009 | Kapoor | G06F 3/0604 711/103 |
| 2009/0119526 A1* | 5/2009 | Liu | G06F 1/3228 713/323 |
| 2009/0271644 A1* | 10/2009 | Fiebrich | G06F 1/266 713/320 |
| 2009/0300380 A1* | 12/2009 | Vojak | G06F 1/3228 713/310 |
| 2010/0022188 A1* | 1/2010 | Nakagawa | H04B 5/02 455/41.2 |
| 2010/0152912 A1 | 6/2010 | Huang | |
| 2010/0328086 A1* | 12/2010 | Yin | H02J 7/0047 340/636.1 |
| 2011/0018854 A1 | 1/2011 | Barclay | |
| 2011/0260555 A1* | 10/2011 | McGinley | G06F 1/266 307/112 |
| 2012/0198246 A1* | 8/2012 | German | H04Q 1/142 713/300 |
| 2012/0272074 A1 | 10/2012 | Zeung | |
| 2013/0020995 A1* | 1/2013 | Kim | H02J 9/005 320/111 |
| 2013/0031394 A1 | 1/2013 | Hayashi | |
| 2013/0033233 A1* | 2/2013 | Noda | H02J 9/005 320/135 |
| 2013/0073758 A1* | 3/2013 | Chang | H02J 7/00 710/106 |
| 2013/0076298 A1 | 3/2013 | Miller | |
| 2013/0198537 A1 | 8/2013 | Uehara | |
| 2013/0318383 A1 | 11/2013 | Takizawa | |
| 2013/0326254 A1* | 12/2013 | Lorin | G06F 1/3234 713/323 |
| 2014/0006828 A1 | 1/2014 | Kanematsu | |
| 2014/0157026 A1* | 6/2014 | So | G06F 1/3206 713/323 |
| 2014/0214233 A1* | 7/2014 | Watanabe | G06F 1/3287 701/1 |
| 2015/0067373 A1* | 3/2015 | So | G06F 1/325 713/323 |
| 2015/0067374 A1 | 3/2015 | Kim | |
| 2015/0372826 A1* | 12/2015 | Blaut | H04L 12/10 307/1 |
| 2016/0054786 A1 | 2/2016 | Chenault | |
| 2016/0224085 A1* | 8/2016 | Jo | G06F 13/10 |
| 2016/0328579 A1* | 11/2016 | Jois | G06F 21/85 |
| 2018/0097395 A1* | 4/2018 | Yoshida | H02J 7/00036 |
| 2018/0175300 A1* | 6/2018 | Kamepalli | G06F 13/24 |
| 2018/0210526 A1 | 7/2018 | Lee | |
| 2018/0275738 A1* | 9/2018 | Pawar | G06F 13/4282 |
| 2018/0301918 A1* | 10/2018 | Lupo | H02J 7/00714 |
| 2018/0368066 A1* | 12/2018 | Howell | G16H 40/40 |
| 2022/0194506 A1* | 6/2022 | Sparrow | H05B 45/10 |

OTHER PUBLICATIONS

Wikipedia, "Advanced Configuration and Power Interface," Retrieved from https://en.wikipedia.org/w/index.php?title=Advanced_Configuration_and_Power_Interface&oldid=847165333, Aug. 10, 2018, 8 pages.

* cited by examiner

TRANSITION INTO AND OUT OF A PARTIALLY-OFF POWER STATE

CROSS-REFERENCE TO RELATED APPLICATIONS

This application is a continuation of U.S. patent application Ser. No. 16/133,390, filed Sep. 17, 2018, entitled "Transition into and out of a Partially-Off Power State," naming Jyoti Rahej a and Alexander J. Branover as inventors, which application is incorporated herein by reference in its entirety.

BACKGROUND

Description of the Related Art

In current computer systems (e.g., desktops/laptops/game consoles/tablets, cell phones), the system can be put into low power states to save power and extend battery life. The Advanced Configuration and Power Interface (ACPI) specification is an industry standard that defines common interfaces for power management and gives the operating system (OS) control of power management. The ACPI standard specifies various power states, among them global states, device states, performance states, and processor states. ACPI specifies states with different power consumption. The state S0 is the working system state and consumes the most power. State S5 (also known as the shutdown state or soft off) provides the lowest power consumption, except for mechanical off. Various lower power states (S1-S3) maintain system state in volatile memory and consume less power than the working state. Some components remain powered in these lower power states so the system can wake in response to input from such devices as keyboards, local area networks, or USB devices. State S4 is a hibernation state but still maintains system state. In current S5 state implementations, the computer system state does not save system state. Only minimal hardware remains powered related to the power switch allowing the system to wake up from the shutdown state (come back to the S0 working state when the power switch is activated). Waking from the shutdown state requires a restart with a boot operation and the system restarts the same way it starts from a cold boot.

While these power states have been useful in helping save power, additional flexibility in power management allows more efficient use of system resources.

SUMMARY OF EMBODIMENTS OF THE INVENTION

In one embodiment, a method includes entering a partial off state in a computer system responsive to a trigger event and a first configuration setting. The partial off state is a power state in which a device is capable of being charged via a serial bus port of the computer system and in which a boot cycle is required to return the computer system to a working state and in the partial off state system state is not saved. The computer system returns to a working state from the partial off state responsive to a power switch being pressed.

In another embodiment, a computer system includes a serial bus controller to control at least one serial bus port wherein the computer system is responsive to a first trigger event to enter a partial off state in which a boot cycle is required to return the computer system to a working state and the computer system is responsive to a power switch being pressed to return to a working state and in the partial off state the computer system is configured to supply charging current to a device plugged into the serial bus port. The computer system is responsive to a second trigger event while in the partial off state to return to the working state.

In another embodiment a computer system includes a serial port to supply a charging current to a device plugged into the serial port while the computer system is in a partial off state. A charging circuit supplies the charging current in the partial off state. The computer system further includes a configuration register. The computer system is responsive to a first trigger event and a first setting of the configuration register to enter the partial off state. The computer system is responsive to the first trigger event and a second setting of the configuration register to enter a shutdown state instead of the partial off state. The partial off state is a power state in which a boot cycle is required to return the computer system to a working state and the computer system is responsive to a power switch being pressed to return to a working state.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

For some computer systems it would be desirable to have a low power state that supports charging devices such as a cellular phone, virtual reality glasses, headsets, or other devices through a serial bus port, such as a Universal Serial Bus (USB) port, without having the need to maintain the entire system state. In certain implementations of the current S5 state (also referred to as a shutdown state or soft off state) system state is not saved and no USB hardware remains powered to allow charging of USB devices. While the description refers to USB, that term is intended to include other USB versions such as USB-C. Embodiments described herein provide the ability to keep at least some part of USB controller hardware powered in a modified shutdown state (or keep other charging hardware powered) to allow a device to be charged through a USB port in the modified shutdown state without maintaining system state. Embodiments also include the capability to turn off this USB charging capability depending on runtime system configuration, e.g., when there is no need for charging. This new partial-off state requires a reboot since system state is not saved and allows the system to reboot to the working state in response to activating the power switch.

Figure 1:
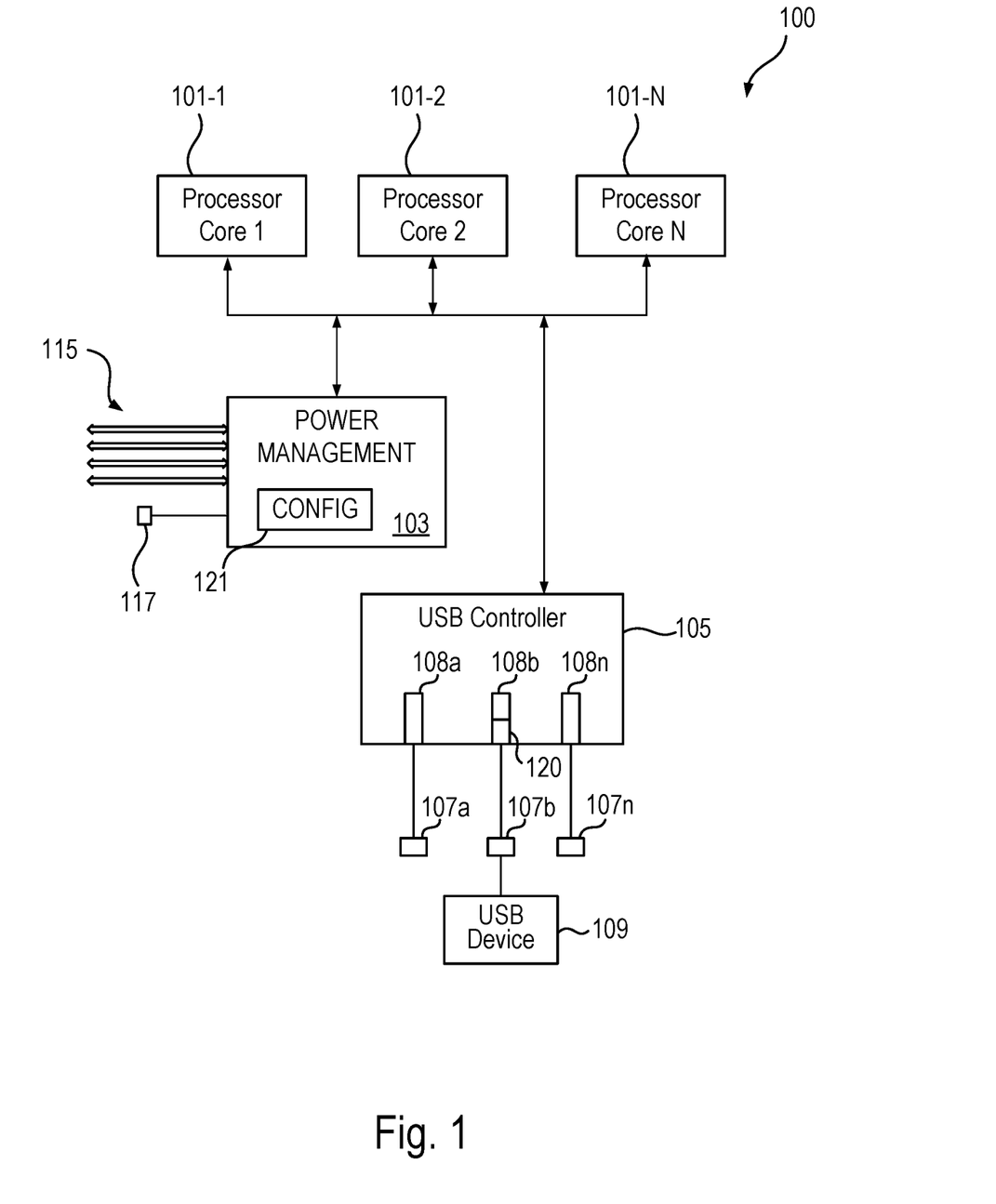
FIG. 1 is a high level block diagram of an embodiment of a computer system that implements the partial off state.

FIG. 1 illustrates a computer system 100 that is suitable for incorporating one or more embodiments described herein. The computer system 100 includes one or more processing cores 101-1 through 101-N, where N is an integer. Note that in embodiments the processing cores 101-1 through 101-N include central processing units (CPUs) and/or graphics processing units (GPUs). The computer system 100 also includes a power management controller 103 to control the various power states of the computer system 100. In addition, the computer system includes an input/output controller that includes a serial bus controller 105 that controls serial bus ports 107a, 107b, 107n. In an embodiment, the serial bus is a USB. In traditional architectures, the USB controller was part of a "hub" circuit that is separate from the integrated circuit containing the CPUs/GPUs. As systems move towards higher levels of integration, one system on a chip (SOC) implementation has the cores, power management controller, and the I/O controller (relevant here—the USB controller) on a single integrated circuit. Other implementations have the USB controller on a separate integrated circuit. Other aspects of the computer system 100 such as the memory controller, system memory, and other types of input/output controllers are well known and not shown in FIG. 1 for ease of illustration.

Power management controller 103 manages power states associated with various hardware blocks (e.g., the cores) of computer system 100. Thus, the power management controller 103 directly or indirectly controls various power planes 115 that supply power to various components of the computer system 100. Thus, for example, in the shutdown (or S5) state, the various power planes 115 are turned off except for power supplied to enable operation of the power switch 117. In an embodiment, the power management controller causes the computer system to enter the shutdown state after a period of inactivity or other triggering event. For example, the operating system sends the computer system to the S3 or S5 state based either on a user's explicit request (requested by pressing a sleep button or shutdown button respectively) or after a programmable duration of inactivity in the system. Note that the system cannot enter the S5 state from S3 directly. The system has to return to the working state and then process a request to enter S5.

Rather than enter a full shutdown state, embodiments provide power to at least some part of the USB control circuit hardware to allow charging of USB devices in a modified shutdown state, referred to herein as the partial off state. In that way, computer system 100 can enter a low power state without saving state while still having at least one USB port available for device charging. In addition, in embodiments, at least a portion of the power controller remains on, allowing the computer system to exit or remain in the partial off state depending on particular conditions as explained further below. Alternatively, a separate microcontroller connected to an always on power plane is used in the partial off state to control exiting the partial off state as described further herein.

Figure 2:
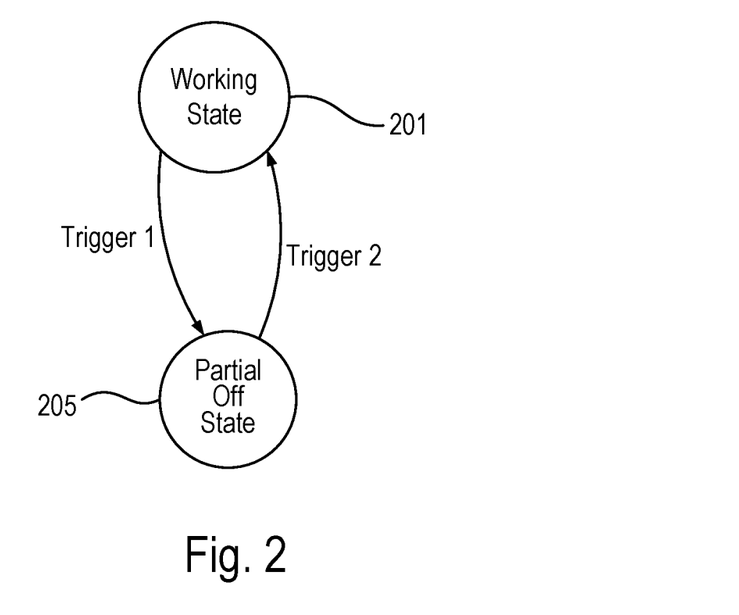
FIG. 2 illustrates power management control associated with an embodiment of a computer system utilizing the partial off state.

FIG. 2, illustrates a high level diagram of operation of an embodiment of the power management controller 103 that causes the computer system to enter the partial off state. A trigger event (Trigger 1) causes the computer system in the working state 201 to enter the partial off state 205. In an embodiment the computer system remains in the partial off state until a trigger event (Trigger 2) returns the computer system to the working state. The push of the power switch 117 is one such Trigger 2 event that causes the computer system to return to the working state from the partial off state. In embodiments, other USB events result in a trigger event returning the computer to the working state. For example, an overcurrent condition on the USB port causes a wakeup from power states. USB ports are current limited for safety reasons. If an overcurrent condition is detected, the USB controller takes appropriate action such as waking the system or disabling USB port power. In embodiments, an overcurrent condition is detected external to the SOC. In embodiments, an SOC has a certain number of overcurrent pins, which may not be equal to the number of USB ports. The available overcurrent pins are mapped to the USB ports. Note this event will not typically be available for waking up the system as it is based on an emergency event. In addition, in embodiments, a device initiated resume/wake signaling from a connected USB device causes a Trigger 2 event. If this wakeup event is available, embodiments avoid the need for power button hardware to wake up the system because the attached USB port device can initiate a low power state exit. Other embodiments provide both power button and device initiated resume signaling.

In the partial off state a device may be plugged into the serial port for charging but the plug and unplug events do not cause a wakeup event. The wake on Connect Enable and WDE (Wake on Disconnect enable) bits are not set in hibernation/power states. The system remains in the partial off state able to charge devices plugged into the USB port until a mechanical off state or the system returns to the working state. The system exits the partial S5 state and returns to the working state 201 in response to an event trigger such as a user pushing the power switch 117.

Figure 3:
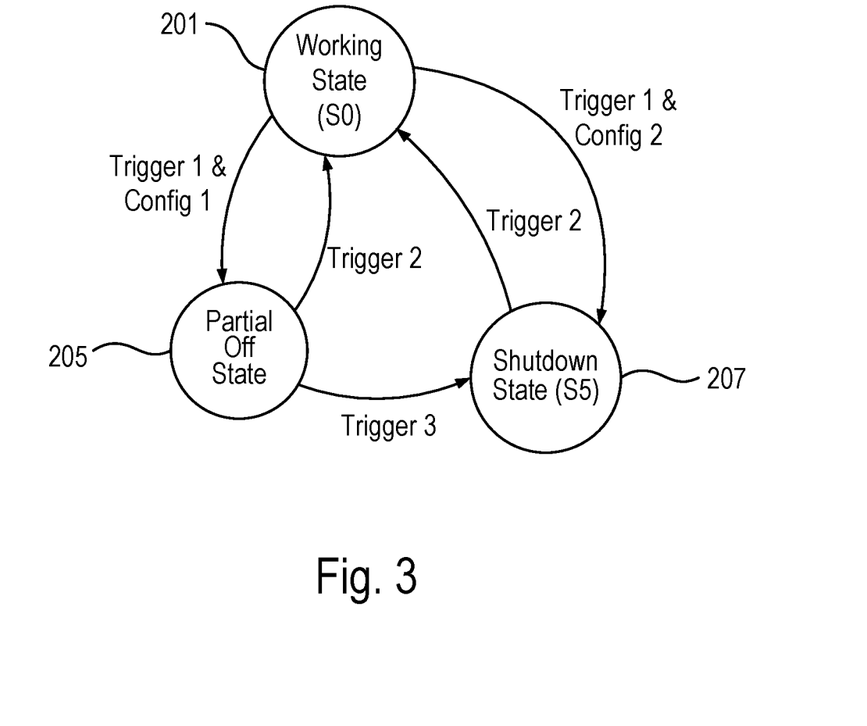
FIG. 3 illustrates the power management control associated with another embodiment of a computer system utilizing the partial off state.
Figure 4:
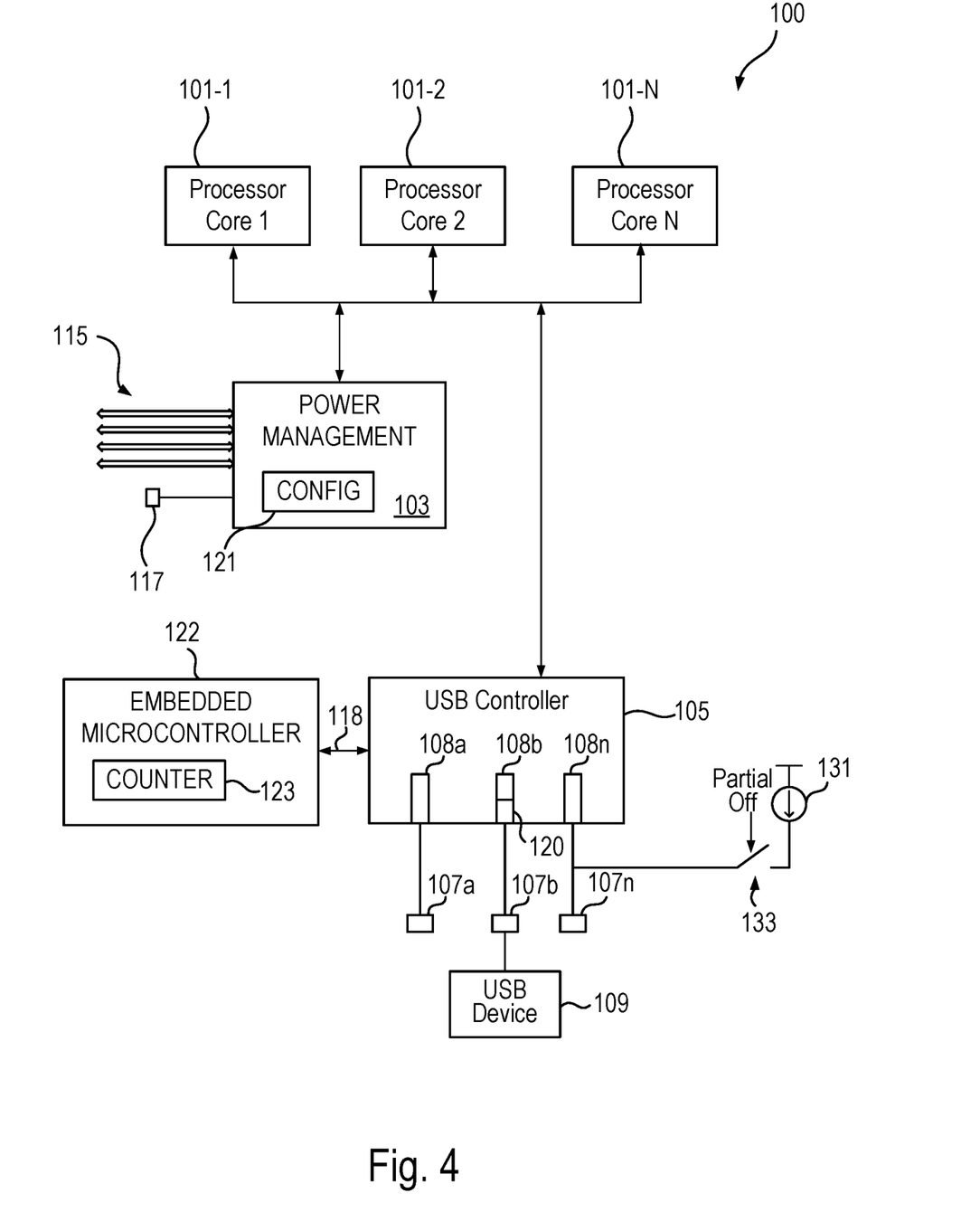
FIG. 4 is a high level block diagram of another embodiment of a computer system that implements the partial off state The use of the same reference symbols in different drawings indicates similar or identical items.

Referring to FIGS. 3 and 4, in other embodiments, the computer system 100 enters the shutdown state 207 from the partial off state 205. As in FIG. 2, the system enters the partial off state 205 from the working state 201 in response to trigger 1 event (e.g., a user request). In an embodiment discussed further herein, a configuration setting (config 1) is also required. In other embodiments, the configuration setting is not used. The computer system returns to the working state from the partial off state in response to trigger 2 (e.g., a user pushing the power button). Referring to FIG. 4, in an embodiment, the power management controller 103 is off in the partial off state along with the rest of the computer system except for the USB controller (or portions thereof). Thus, in order to provide the ability to move to the shutdown state while in the partial off state an embedded microcontroller 122 powered from an always on power plane (or located in a base management controller (BMC)) maintains a counter 123 to count a predetermined amount of time after entering the partial off state and at the end of the time period exits the partial off state 205 and enters the shutdown state 207. For example, in an embodiment the computer system stays in the partial off state for one hour (or other appropriate amount of time) before exiting the partial off state and entering the shutdown state. In such an embodiment, expiration of the time period counted in counter 123 provides the trigger 3 that moves the power state from the partial off state 205 to the shutdown state 207. In an embodiment, as part of entering the shutdown state from the partial off state, the embedded microcontroller causes one of the power planes 115 supplying the USB controller 105 to be shut off. As in conventional systems, a trigger 2 event, such as a user pushing the power switch, returns the system to the working state 201 from the shutdown state 207. Alternatively, the control structure such as the embedded microcontroller may be located in portion of the power management controller 103 that remains on in the partial off state to allow the computer system to move to the shutdown state from the partial off state responsive to the various conditions discussed.

As is known in the art, the USB controller detects USB attach/detach events in which a device is plugged into or unplugged from a USB port. In embodiments, the USB controller supplies information regarding the plug/unplug events to the microcontroller 122 via communication interface 118. In an embodiment, while in the partial off state, the microcontroller makes decisions about the partial off state based on plug and unplug events. For example, in an embodiment, the counter 123 is used to help determine when to exit the partial off state and enter the full shutdown state 207. In an embodiment, a plugin event in the partial off state causes the counter to stop counting and/or reset. An unplug event following the plug event causes the counter to start counting again. In other embodiments, while in the partial off state, in response to a plugin event, the USB controller senses when a charging current is no longer being supplied to the plugged in USB device in current sense circuit 120, indicating the device is fully charged, and the counter 123 begins counting in response to the end of the device charging or an unplug event, whichever occurs first. In that way, the device can fully charge in the partial off state but if no other devices are plugged in within the time period counted by the counter 123, the computer system 100 transitions to the shutdown state. In the shutdown state, the USB controller is fully off and additional power is saved. Note that in embodiments the various time periods counted by counter 123 are programmable. Responsive to entering the shutdown state, any system charging capability for devices plugged into a USB port is turned off.

In other embodiments, the USB controllers 108a, 108b, and 108n along with the power management controller 103 are powered off in the partial off state. Devices plugged into the serial port are charged from a current source 131 coupled to an always on power plane that is switched to connect to the serial bus port 107n through switch 133 in the partial off state. In that way the USB controller is powered off in the partial off state and the computer system remains in the partial off state until a trigger 2 event as shown in FIG. 2.

In addition, in embodiments the computer system is configured to enter the partial off state or not enter the partial off state depending on configuration of the system. Referring again to FIG. 3, in an embodiment, when the computer system is set for maximum power savings to conserve battery or other configuration setting (config 2) to skip the partial off state, the computer system 100 enters the shutdown state 207 instead of the partial off state in response to a trigger 1 event and a config 2 configuration setting. With a config 1 setting, the systems enters the partial off state 205 with a trigger 1 occurrence. In embodiments, the computer system is configurable to selectively enable the partial off state according to user preference. Thus, the value of configuration register 121 (see FIG. 4) selectively enables/disables the ability to enter the partial off state. While shown as part of power management controller 103, the configuration register 121 can be located anywhere in the computer system accessible to the power management logic. In embodiments, the runtime environment controls the configuration register to determine in addition to, or instead of user preference, whether to enter the partial off state. For example, for certain runtime environments, e.g., in server applications, there is no need to charge devices through USB ports and the partial off state is unnecessary.

In other environments, the number of USB ports that are enabled in the partial off state are limited to fewer than the total number of USB ports. For example, in an embodiment the computer system detects that some of the USB ports supported by the USB controller have devices plugged in, such as a mouse, a wireless mouse/keyboard controller, or other device that does not require charging, and on entering the partial off state, those ports remain unpowered as if in the shutdown state while other one or more USB ports remain powered. Thus, e.g., logic 108a and 108n is powered off in the partial off state to save additional power, while 108b remains powered to power USB device 109. In still other embodiments, the location of the USB port in the system, e.g., on the front or back of a desktop computer system determines whether to keep the port alive in the partial off state. Thus, for example, USB ports that are conveniently located for users to plug in and charge USB devices remain powered in the partial off state and other ports are turned off.

In embodiments, the control logic to implement the power management functions is implemented using discrete logic, a programmable microcontroller, or using any appropriate combination of programmable and discrete logic.

Thus, aspects of entering and exiting a partial off state have been described. The description set forth herein is illustrative, and is not intended to limit the scope of the following claims. While the description herein has referred to the USB, the approaches described herein apply to other serial buses having ports that can be used to charge devices. Variations and modifications of the embodiments disclosed herein may be made based on the description set forth herein, without departing from the scope and spirit of the following claims.

What is claimed is:

1. A method comprising:
   entering a partial off state in a computer system responsive to a trigger event and a first configuration setting, the partial off state being a power state in which a device is capable of being charged via a serial bus port of the computer system, the partial off state being a power state in which a boot cycle is required to return the computer system to a working state and in the partial off state system state is not saved;
   supplying charging current to the device through the serial bus port during the partial off state;
   sensing whether the charging current is no longer being supplied to the device plugged into the serial bus port;
   detecting whether an unplug event occurs;
   starting to count a predetermined period of time in a counter responsive to sensing the charging current is no longer being supplied prior to the unplug event;
   starting to count the predetermined period of time responsive to the unplug event occurring before sensing the charging current is no longer being supplied; and
   leaving the partial off state and entering a shutdown state responsive to the counter counting the predetermined period of time and no other devices being plugged in during the predetermined period of time.

2. The method as recited in claim 1, further comprising entering the shutdown state instead of the partial off state responsive to the trigger event and a second configuration setting.

3. The method as recited in claim 1, further comprising:
   using a serial bus controller to control the serial bus port; and
   turning off a power plane supplying the serial bus controller in association with leaving the partial off state and entering the shutdown state.

4. The method as recited in claim 1, further comprising:
   entering a working state from the partial off state responsive to a wake event occurring before entering the shutdown state.

5. A computer system comprising:
   a serial bus controller to control at least one serial bus port;

wherein the computer system is responsive to a first trigger event to enter a partial off state in which a boot cycle is required to return the computer system to a working state and the computer system is responsive to a power switch being pressed to return to a working state from the partial off state and in the partial off state the computer system is configured to supply a charging current to a device plugged into the serial bus port;

a counter to count a predetermined period of time responsive to entering the partial off state;

wherein the counter stops counting responsive to a plugin event after entering the partial off state, remains in the partial off state, and the counter resumes counting responsive to an unplug event; and wherein the computer system is responsive to the counter indicating passage of the predetermined period of time to leave the partial off state and enter a shutdown state.

6. The computer system as recited in claim 5, further comprising:

a power plane to supply power to the serial bus controller; and wherein the computer system, associated with leaving the partial off state and entering a shutdown state, causes the power plane to be turned off to remove power from the serial bus controller.

7. The computer system as recited in claim 5, wherein the serial bus controller is a universal serial bus (USB) controller.

8. The computer system as recited in claim 5, further comprising:

a first integrated circuit including a plurality of processors, the plurality of processors being turned off in the partial off state; and a second integrated circuit communicatively coupled to the first integrated circuit and including the serial bus controller.

9. A computer system comprising:

a serial bus port to supply a charging current to a device plugged into the serial bus port while the computer system is in a partial off state;

a counter operable in the partial off state to count a time period;

wherein in the partial off state a serial bus controller controlling the serial bus port supplies an indication of an unplug event in which the device is unplugged from the serial bus port and the serial bus controller supplies an indication of when the charging current is no longer being supplied to the device plugged into the serial bus port;

wherein the partial off state is a power state in which a boot cycle is required to return the computer system to a working state;

wherein the computer system is responsive to the unplug event and passage of the time period counted in the counter to leave the partial off state and enter a shutdown state and the computer system is responsive to the indication that the charging current is no longer being supplied to the device plugged into the serial bus port and the passage of the time period counted in the counter to leave the partial off state and enter a shutdown state;

wherein the counter starts counting responsive to the indication that the charging current is no longer being supplied to the device plugged into the serial bus port and starts counting responsive to the indication of the unplug event, whichever occurs first; and wherein the computer system is configured to leave the partial off state after the counter indicates the time period has passed.

10. The computer system as recited in claim 9, further comprising:

a configuration register;

wherein the computer system is responsive to a first trigger event and a first setting of the configuration register to enter the partial off state; and wherein the computer system is responsive to the first trigger event and a second setting of the configuration register to enter the shutdown state instead of the partial off state.

11. The computer system as recited in claim 9, further comprising:

a power plane to supply power to the serial bus controller; and wherein the computer system, associated with leaving the partial off state and entering a shutdown state, causes the power plane to be turned off to remove power from the serial bus controller.

12. The method as recited in claim 1, further comprising:

enabling the serial bus port for charging the device in the partial off state; and keeping at least another serial bus port unpowered in the partial off state responsive to the computer system detecting that the other serial bus port has a device plugged in that does not require charging.

13. The computer system as recited in claim 5 wherein the serial bus controller is configured to supply an indication of the unplug event responsive to the device being unplugged from the serial bus port.

14. The computer system as recited in claim 5, further comprising:

a plurality of serial bus ports including the at least one serial bus port; and wherein the computer system enables the at least one serial bus port for charging in the partial off state and the computer system keeps at least another one of the serial bus ports unpowered in the partial off state responsive to the computer system detecting that the other one of the serial bus ports has a device plugged in that does not require charging.

15. The computer system as recited in claim 5 wherein the counter resets responsive to the plugin event.

16. The computer system as recited in claim 9, wherein the serial bus controller is a universal serial bus (USB) controller.

17. The computer system as recited in claim 9, further comprising:

a first integrated circuit including a plurality of processors, the plurality of processors being turned off in the partial off state; and a second integrated circuit communicatively coupled to the first integrated circuit and including the serial bus controller.

18. The computer system as recited in claim 9, further comprising:

a plurality of serial bus ports including the serial bus port; and wherein the computer system enables the serial bus port for charging in the partial off state and the computer system keeps at least another one of the serial bus ports unpowered in the partial off state responsive to the computer system detecting that the other one of the serial bus ports has a device plugged in that does not require charging.

19. The computer system as recited in claim 9 wherein the counter resets responsive to a plugin event.

\* \* \* \* \*